US009324058B2

(12) United States Patent
Eren et al.

(10) Patent No.: US 9,324,058 B2
(45) Date of Patent: *Apr. 26, 2016

(54) CACHING MESSAGE FRAGMENTS DURING REAL-TIME MESSAGING CONVERSATIONS

(75) Inventors: Selcuk S. Eren, Chapel Hill, NC (US); Brian J. Jaeger, Chapel Hill, NC (US); Douglas A. Law, Chapel Hill, NC (US); Paul A. Roberts, Raleigh, NC (US); Shawn K. Sremaniak, Chapel Hill, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 705 days.

This patent is subject to a terminal disclaimer.

(21) Appl. No.: 13/532,782

(22) Filed: Jun. 26, 2012

(65) Prior Publication Data

US 2012/0272161 A1    Oct. 25, 2012

Related U.S. Application Data

(63) Continuation of application No. 11/397,447, filed on Apr. 4, 2006, now Pat. No. 8,255,473.

(51) Int. Cl.
*G06F 15/16* (2006.01)
*G06Q 10/10* (2012.01)

(52) U.S. Cl.
CPC .................................. *G06Q 10/107* (2013.01)

(58) Field of Classification Search
CPC ..................................................... G06Q 10/107
USPC ................................................. 709/204–206
See application file for complete search history.

(56) References Cited

U.S. PATENT DOCUMENTS

| 5,790,789 | A | 8/1998 | Suarez |
| 5,818,447 | A | 10/1998 | Wolf et al. |
| 6,157,915 | A | 12/2000 | Bhaskaran et al. |
| 6,332,163 | B1 | 12/2001 | Bowman-Amuah |
| 6,339,754 | B1 | 1/2002 | Flanagan et al. |
| 7,007,235 | B1 | 2/2006 | Hussein et al. |
| 7,111,044 | B2 * | 9/2006 | Lee ............................... 709/204 |
| 7,617,283 | B2 * | 11/2009 | Aaron et al. ................... 709/206 |
| 7,640,293 | B2 * | 12/2009 | Wilson et al. .................. 709/203 |
| 2003/0036393 | A1 * | 2/2003 | Kanefsky ....................... 455/466 |
| 2003/0120813 | A1 | 6/2003 | Majumdar et al. |
| 2003/0131142 | A1 | 7/2003 | Horvitz et al. |
| 2003/0182428 | A1 | 9/2003 | Li et al. |
| 2003/0187935 | A1 | 10/2003 | Agarwalla et al. |

(Continued)

OTHER PUBLICATIONS

SMS Handbook, Palm, Inc 1998-2001.*

(Continued)

*Primary Examiner* — Emmanuel L Moise
*Assistant Examiner* — Marie Georges Henry
(74) *Attorney, Agent, or Firm* — Marcia L. Doubet

(57) ABSTRACT

Creating and managing an editable cache of unsent message fragments during conversations using real-time messaging systems (such as instant messaging, text messaging, chat sessions, and so forth). Using this cache, a user participating in a real-time messaging conversation can cache at least one message fragment, and can then recall selected fragments for review and/or editing (as desired by the particular user) before sending to other conversation participants. Preferably, any unsent message fragment from the cache can be sent, upon request of the user, through a mouse click or keystroke.

19 Claims, 5 Drawing Sheets

(56) References Cited

U.S. PATENT DOCUMENTS

| | | |
|---|---|---|
| 2003/0220901 A1 | 11/2003 | Carr et al. |
| 2004/0019487 A1 | 1/2004 | Kleindienst et al. |
| 2006/0167747 A1* | 7/2006 | Goodman et al. ............. 705/14 |
| 2007/0198645 A1* | 8/2007 | Chen et al. ................. 709/207 |
| 2007/0233801 A1 | 10/2007 | Eren et al. |
| 2009/0265763 A1* | 10/2009 | Davies et al. ................ 726/3 |

OTHER PUBLICATIONS

Selcuk S. Eren et al., U.S. Appl. No. 11/397,447, filed Apr. 4, 2006, Office Action, Dec. 24, 2008, 17 pages.

Selcuk S. Eren et al., U.S. Appl. No. 11/397,447, filed Apr. 4, 2006, Office Action, Jul. 13, 2009, 19 pages.

Selcuk S. Eren et al., U.S. Appl. No. 11/397,447, filed Apr. 4, 2006, Office Action, Mar. 9, 2010, 18 pages.

Selcuk S. Eren et al., U.S. Appl. No. 11/397,447, filed Apr. 4, 2006, Advisory Action, Jun. 3, 2010, 3 pages.

Selcuk S. Eren et al., U.S. Appl. No. 11/397,447, filed Apr. 4, 2006, Pre-Appeal Brief Conference Decision, Aug. 12, 2010, 2 pages.

Selcuk S. Eren et al., U.S. Appl. No. 11/397,447, filed Apr. 4, 2006, Office Action, Nov. 15, 2010, 18 pages.

Selcuk S. Eren et al., U.S. Appl. No. 11/397,447, filed Apr. 4, 2006, Office Action, May 9, 2011, 15 pages.

Selcuk S. Eren et al., U.S. Appl. No. 11/397,447, filed Apr. 4, 2006, Pre-Appeal Brief Conference Decision, Sep. 20, 2011, 2 pages.

Selcuk S. Eren et al., U.S. Appl. No. 11/397,447, filed Apr. 4, 2006, Office Action, Nov. 28, 2011, 13 pages.

Selcuk S. Eren et al., U.S. Appl. No. 11/397,447, filed Apr. 4, 2006, Pre-Appeal Brief Conference Decision, Apr. 9, 2012, 2 pages.

Selcuk S. Eren et al., U.S. Appl. No. 11/397,447, filed Apr. 4, 2006, Examiner Interview Summary, Apr. 20, 2012, 1 page.

Selcuk S. Eren et al., U.S. Appl. No. 11/397,447, filed Apr. 4, 2006, Notice of Allowance, Apr. 20, 2012, 13 pages.

\* cited by examiner

# US 9,324,058 B2

CACHING MESSAGE FRAGMENTS DURING REAL-TIME MESSAGING CONVERSATIONS

BACKGROUND

The present invention relates generally to computer systems, and more particularly to computer systems that use real-time messaging conversations.

Real-time messaging systems such as instant messaging, text messaging, and chat sessions have gained tremendous popularity in recent years. In these systems, users communicate with one another in real time by exchanging messages over a network, such as the public Internet or a cellular network. Example instant messaging ("IM") systems include Lotus® Sametime® from International Business Machines Corporation ("IBM®") and Instant Messenger™ from America Online, Inc. Short Message Service ("SMS") is an example of text messaging support that is available to users of devices such as modern cellular telephones. Interactive chat sessions may be accessed using a number of devices, including laptop computers, Web-enabled cellular telephones, and so forth. ("Lotus", "Sametime", and "IBM" are registered trademarks of International Business Machines Corporation in the United States, other countries, or both. "Instant Messenger" is a trademark of America Online, Inc.)

Typically, IM users maintain a listing of people they frequently contact via their IM system. This listing is commonly displayed on the graphical user interface ("GUI") of the user's IM client, and is often referred to as a "buddy list"; the people on the buddy list are referred to as "buddies" or "IM buddies". Other real-time messaging systems may have address books, so-called "short lists", or analogous means of enabling users to quickly locate a stored address for one or more message recipients.

BRIEF SUMMARY

The present invention provides caching of message fragments during real-time messaging conversations. This preferably further comprises: receiving, while a user is creating a first outbound chat message during a real-time messaging conversation, an inbound chat message; caching the created first outbound chat message as a message fragment in a message cache, subsequent to the receiving and without sending the first outbound chat message; sending a second outbound chat message created by the user during the real-time messaging conversation, the second outbound chat message responding to the received inbound chat message; subsequent to the sending of the second outbound chat message and responsive to a request of the user, recalling the cached message fragment from the message cache and restoring content of the first outbound chat message from the recalled message fragment; and sending the first outbound chat message during the real-time messaging conversation.

The user may request the caching, for example, by selecting a clickable graphic rendered on a GUI of the real-time messaging conversation or by selecting a hot key indicated on the GUI.

Preferably, a representation of each cached message fragment is displayed in a sub-window, and the sub-window(s) is/are rendered on the GUI. Multiple sub-windows are preferably rendered on the GUI when multiple message fragments are cached, each rendered sub-window representing a different one of the cached message fragments. In this case, each of the sub-windows is preferably rendered in a push-down stack order.

The user may select one of the rendered sub-windows. Preferably, the cached message fragment from the selected sub-window is then copied to the active window (and the selected sub-window may be closed). The user may then edit and/or send the message fragment to another user (or users) participating in the real-time messaging conversation. Preferably, the cached message fragment is deleted after sending it to the other user(s).

A plurality of real-time messaging conversations may be simultaneously active, in which case message fragments for each of the real-time messaging conversations are preferably cached in a logically-separate message cache. Optionally, message fragments may be dragged and dropped from the GUI of one real-time messaging conversation to another.

An embodiment of the present invention may be provided as a method, system, or computer program product. It will be understood that the foregoing summary contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

The present invention will be described with reference to the following drawings, in which like reference numbers denote the same element throughout.

DETAILED DESCRIPTION

Figure 1:
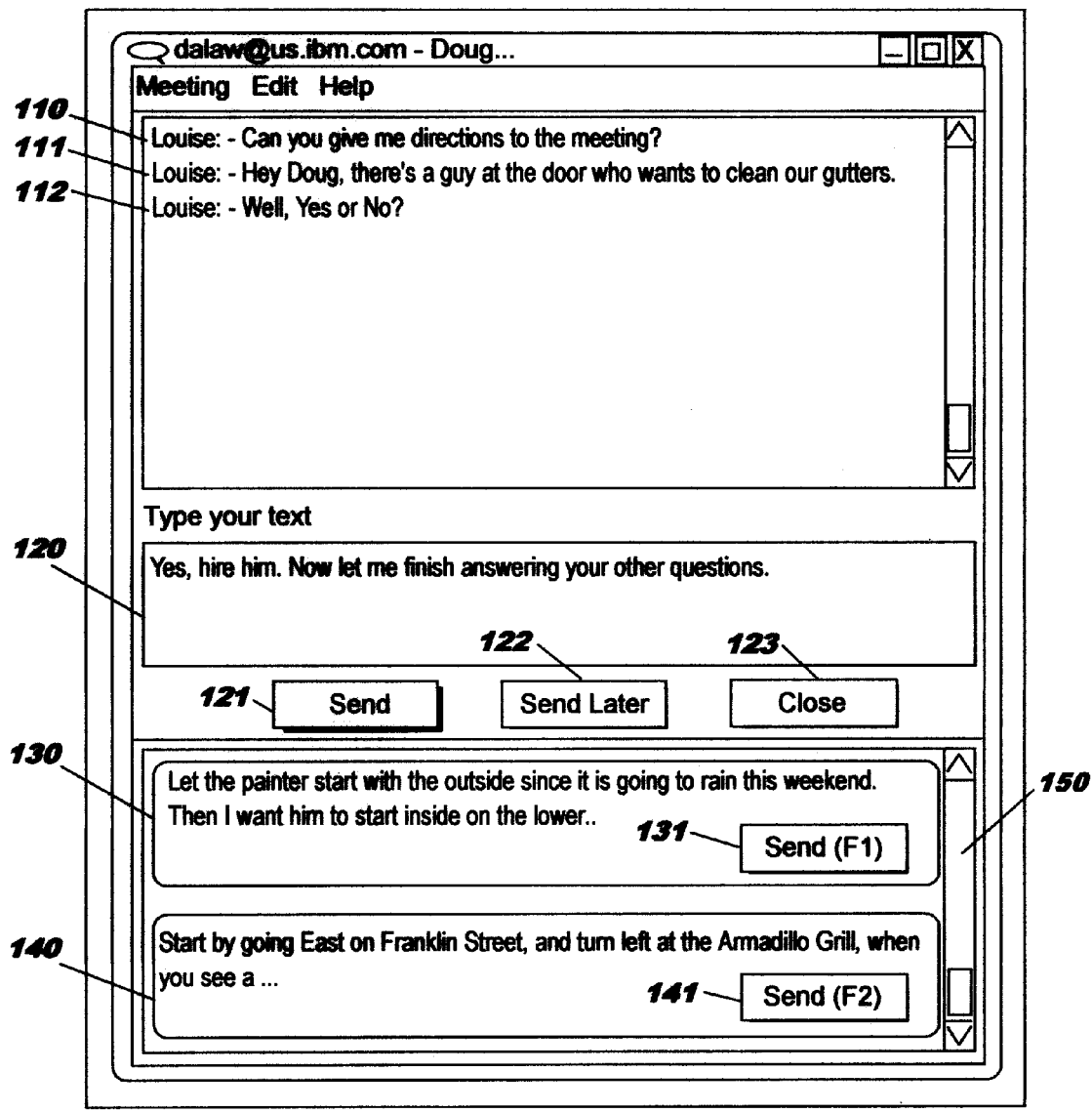
FIG. 1 illustrates a scenario where a first IM user and a second IM user are exchanging instant messages during a hypothetical IM conversation, and depicts a sample instant messaging GUI according to one aspect of preferred embodiments of the present invention.

When involved in a conversation on an IM system, a user may receive a new instant message containing a question or comment, while still responding to a previous instant message. When this happens, what people traditionally do when using an existing IM system is highlight the message fragment they have typed so far, copy the highlighted text to the operating system clipboard, send a response to the new message, and then paste the saved message fragment from the operating system clipboard back into the chat window, where it can be completed and then sent. This approach is time-consuming and cumbersome.

Preferred embodiments of the present invention are directed toward creating an editable cache of unsent message fragments. The cache may be provided using a clipboard mechanism, memory or disk space of the local device, storage accessible to that device, and so forth. Using this cache, a user participating in a real-time messaging conversation can cache at least one message fragment, using a mouse click or keystroke, and can then recall selected fragments for review and/or editing (as desired by the particular user) before sending to other users. Preferably, any unsent message fragment from the cache can be sent, upon request of the user, through a mouse click or keystroke. Disclosed techniques allow the user to save or send message fragments with virtually no interruption of the conversation flow.

Using techniques disclosed herein, real-time messaging users may perform in-place editing of unfinished message fragments, and may respond to messages which are thought (by the particular user) to be most urgent without losing any previously-entered, not-yet-sent message fragments. Note that the term "message fragment" is used herein by way of illustration and not of limitation: an entire message may be cached, as well as a fragment of a message. The user may decide whether or not a cached message fragment is, in fact, a complete message upon recalling the message fragment from the cache. Furthermore, where discussions herein refer to using disclosed techniques in an instant messaging system, this is by way of illustration and not of limitation: disclosed techniques may be used with conversations in other real-time messaging systems and environments (such as text messaging, chats, real-time e-mail exchanges, and other technologies, including those which may be as-yet-uninvented) without deviating from the scope of the present invention.

In a preferred embodiment, a clickable "Send" button (or analogous clickable graphic) is provided that takes the contents of the input window on the real-time messaging conversation GUI of the user's real-time messaging client, and opens a sub-window (which is preferably smaller than, and contained within, the conversation GUI window) containing the message fragment entered so far. A shortcut key, also referred to herein as a "hot key", may be provided in addition to, or instead of, the "Send" key. In a preferred embodiment, the shortcut key is a dynamically-assigned function key. Each new sub-window is preferably pushed to the top of a stack of pending-message sub-windows, such that the GUI provides an ordered listing of sub-windows where the most-recently-rendered sub-window appears at the top. When the user is finally ready to send a particular pending message, according to preferred embodiments, he clicks the "Send" button in the message's sub-window (or presses the specified shortcut key).

FIG. 1 illustrates a scenario where a first IM user "Doug" and a second IM user "Louise" are exchanging instant messages during a hypothetical IM conversation. As shown therein, an instant messaging GUI 100 displays messages of the IM conversation, which begins (in this example) with Doug receiving a first IM from Louise that asks "Can you give me directions to the meeting?". See reference number 110. A second IM from Louise is "Hey Doug, there's a guy at the door who wants to clean our gutters.". See reference number 111. A third IM from Louise asks a new question, "Well, Yes or No?". See reference number 112.

Suppose that, upon receiving message 110, Doug begins to type a response to Louise's first question, where this response will provide directions to the meeting. Before he can complete his response, Louise's next message 111—and, perhaps, message 112—arrives. Preferred embodiments enable Doug to cache his partially-typed response to message 110, while at the same time beginning a response to message 111 and/or message 112. In the illustrative GUI 100, a first sub-window is created for Doug's partially-typed response to message 110 (where this message provides some driving directions for Louise), and is shown at 140. Further suppose that Doug receives message 111, and begins to type a response to that message prior to arrival of message 112. A second sub-window is then created for the response to message 111, as shown in FIG. 1 at 130. In the hypothetical GUI 100, Doug then begins to type a response to message 112 in an active window 120 that is used for responding to the current (i.e., most-recently-received) inbound message.

According to preferred embodiments, while he is typing his response in active window 120, Doug has two message fragments cached, one for each of his first two partial responses, as illustrated by sub-windows 140 and 130. In this sample GUI 100, the message fragments are displayed in a push-down stack order, as noted earlier, such that the active window 120 appears above the sub-windows for the cached message fragments, and each of the most-recently-cached message fragments are shown in sub-windows that are successively closer to active window 120.

When Doug is ready to send the message in the active window 120, he may press the "Send" button 121. (A hot key may also, or alternatively, be provided, although this has not been illustrated for window 120.) Or, if he chooses to cache this message for sending later, he may press the "Send Later" button 122. For example, if a fourth message arrives from Louise, Doug may press button 122 to cache the already-typed text from window 120, display that text in a new sub-window (which will preferably appear as the new top-most sub-window on the push-down stack), and then begin typing yet another response in the active window 120. As another option, Doug may choose not to send or cache the message by pressing a "Close" 123 or "Cancel" key.

If Doug wishes to send the text corresponding to a selected sub-window, he preferably presses the "Send" button for that sub-window (or a hot key associated with the sub-window). For example, reference number 131 indicates that the message fragment in sub-window 130 may be sent by pressing the "Send" key rendered in that sub-window or by pressing function key "F1"; similarly, reference number 141 indicates that the message fragment in sub-window 140 may be sent by pressing the "Send" key rendered in that sub-window or by pressing function key "F2".

If Doug chooses to finish typing a message using a cached message fragment before sending it, or to edit a cached message fragment, he preferably selects the corresponding sub-window using a pointing cursor or other selection technique. Following this selection, the text of the cached message fragment is preferably rendered in active window 120.

Preferred embodiments enable a varying number of message fragments to be cached, and sub-windows for these message fragments may be made available from the real-time messaging conversation GUI using a scrolled pane (as indicated by slider bar 150).

Figure 2:
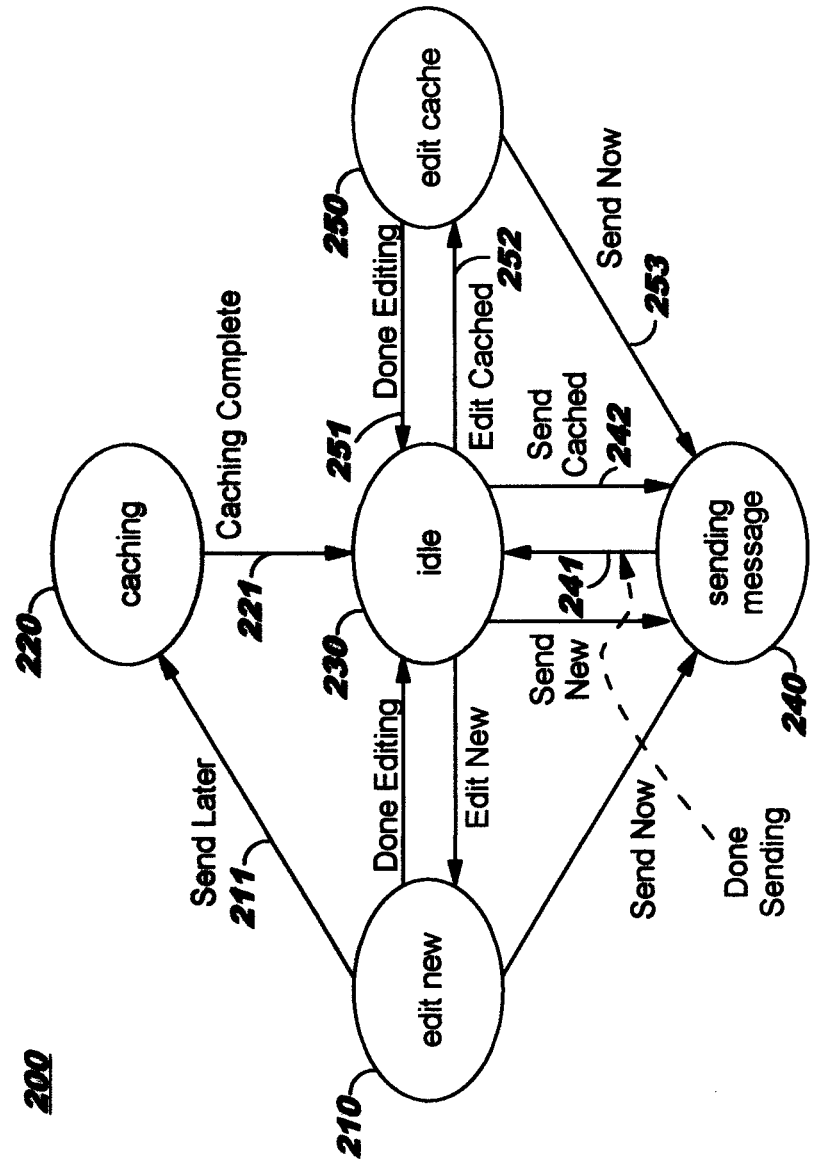
FIG. 2 illustrates states and transitions that may be supported by preferred embodiments.

FIG. 2 provides a state diagram 200 illustrating states and transitions that may be supported by preferred embodiments of the present invention. As shown therein, a real-time messaging conversation may be in an "idle" state 230. From this idle state, the user may choose to edit (i.e., create) a new message. In that case, the "edit new" state 210 is entered. After editing a new message, the user may choose to send the message now, thus transitioning to "sending message" state 240; or, he may choose to cache the message, so it can be sent later, in which case the transition is to the "caching" state 220. As yet another option, the user might choose to close the edit window without sending the message (as illustrated by button 123 in FIG. 1, for example), in which case the "edit new" state 210 is followed by a transition to the "idle" state 230.

The user may also choose to edit an already-cached message, in which case the "edit cache" state 250 is entered. When the cached message has been edited, the user may choose to send the message now, thus transitioning to "sending message" state 240; or, the user may leave the edited message in the cache, thus returning to the "idle" state 230.

After a message is cached during the "caching" state 220, the "idle" state 230 is re-entered. Similarly, the "idle" state 230 is also re-entered after a message is sent from the "sending message" state 240.

From the "idle" state 230, the user may also choose to send a new message, or an already-cached message. A transition then occurs to "sending message" state 240.

In FIG. 2, reference numbers 211, 220-221, 250-253, and 242 indicate functionality provided by preferred embodiments of the present invention.

Figure 3:
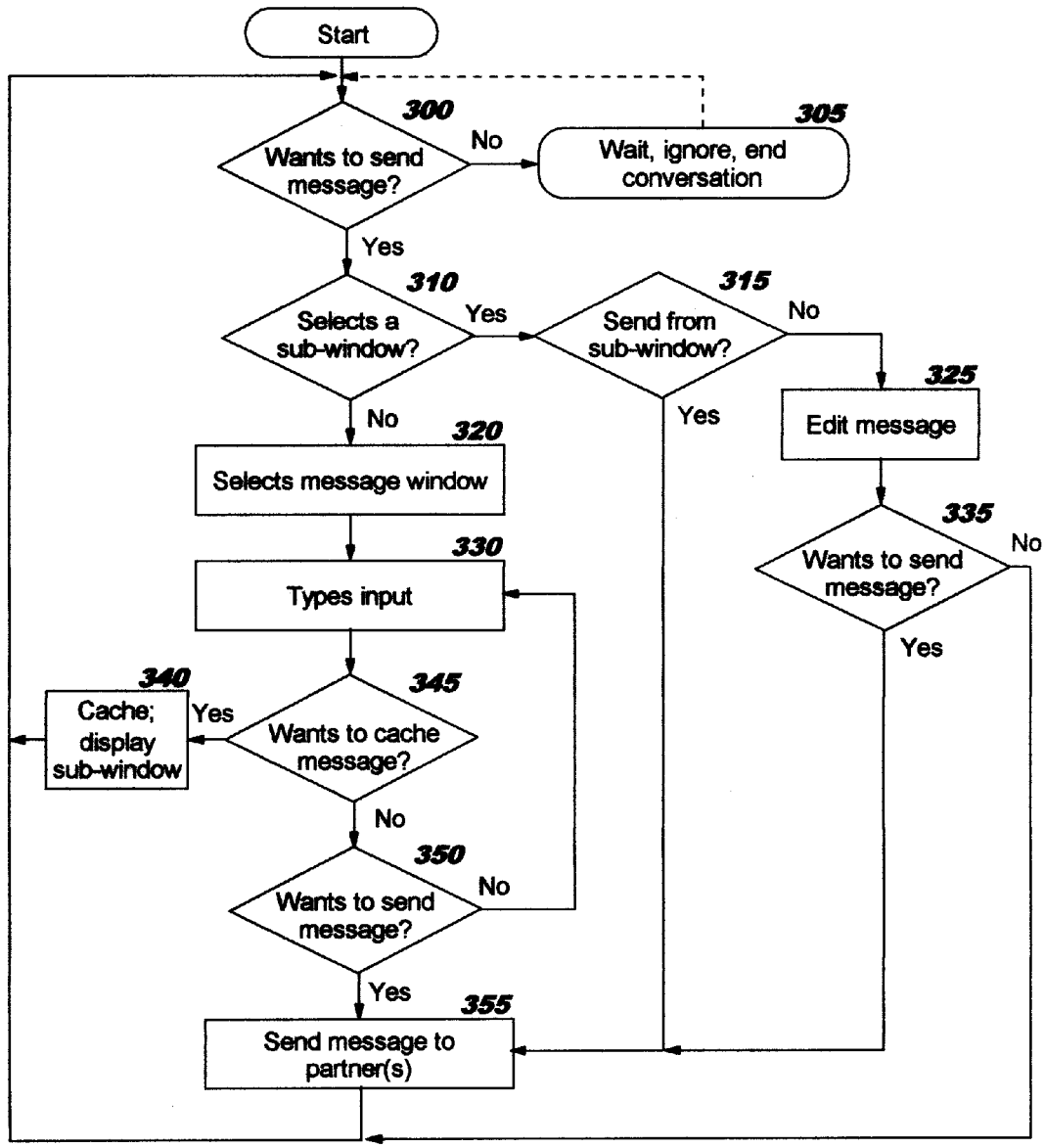
FIG. 3 provides a flowchart depicting logic that may be used when implementing preferred embodiments.

FIG. 3 provides a flowchart depicting logic that may be used when implementing preferred embodiments. As shown therein, a test is made (Block 300) to determine whether a real-time messaging user wants to send a message. If this text has a negative result, the user might alternatively choose (Block 305) to wait to send a message later, or to ignore a message which has been received, or to end the current real-time messaging conversation. If the conversation is not ended, control preferably returns to Block 300.

If the test at Block 300 has a positive result (i.e., the user wants to send a message), then control reaches Block 310. Block 310 tests to see whether the user selects a sub-window that corresponds to a cached message fragment. If not, control reaches Block 320; otherwise, control reaches Block 315.

In Block 320, the user selects the active message window, and types a message into that window (Block 330). Block 345 tests whether the user indicates that he wants to cache this message. If so, the message is cached (Block 340) and in preferred embodiments, a sub-window is displayed with the message fragment rendered therein (as has been discussed with reference to FIG. 1). Control then returns to Block 300.

If the test in Block 345 has a negative result (i.e., the user does not want to cache the message fragment from the active window), then control reaches Block 350, which tests to see if the user wants to send this message. If so, the message is sent (Block 355) to the partner(s) currently participating in this real-time messaging conversation. Control then returns to Block 300.

If the test in Block 350 has a negative result (i.e., the user does not want to send the message fragment from the active window), then control returns to Block 330, where the user can continue typing text into the active window.

Block 315 is reached following a positive result in Block 310, when the user selects a sub-window corresponding to a cached message fragment. Block 315 then tests to see whether the user wants to send the message corresponding to the selected sub-window. If so, control transfers to Block 355, where the message is sent to the other user (or users, as applicable) participating in this real-time messaging conversation. After sending a message, its cache entry is preferably deleted and its corresponding sub-window is preferably removed from the conversation GUI (not shown in FIG. 3).

Otherwise, if the user does not want to send the message at Block 315, the user may edit the cached message fragment corresponding to the selected sub-window (Block 325). According to preferred embodiments, the cached message fragment is rendered in the active window for editing, responsive to selection of the sub-window (and the selected sub-window is preferably closed). After the message is edited, Block 335 tests to see if the user is now ready to send the message. If this test at Block 335 has a positive result, the message is sent at Block 355; otherwise, control preferably returns to Block 300.

If a particular user is participating in more than one real-time messaging conversation simultaneously (e.g., having multiple IM conversations active at one time), preferred embodiments enable the user to cache message fragments for each of these conversations. Preferably, the message fragment cache for each of the simultaneous conversations is logically (or physically) separate, such that the conversation GUI for each conversation represents only the cached message fragments for that particular conversation.

Optionally, the user may be allowed to drag a pending message and drop it to the conversation GUI for a different real-time messaging conversation, and may then send the message to the participant(s) in that different conversation. In this case, the sub-window from which the message is dragged may be deleted, responsive to the drag-and-drop; or, the sub-window may be left in existence after the drag-and-drop operation, thus allowing the message to be dragged to the conversation GUI of multiple different conversations. Optionally, the user may be allowed to configure whether the sub-window will be closed or left in existence. (It will be obvious to one of ordinary skill in the art, once the teachings provided herein are known, how functionality supporting these options may be added to the logic depicted in FIG. 3.)

Using techniques disclosed herein, real-time messaging users can manage message fragments which are not yet sent and which may not yet be complete. By rendering message fragments using multiple sub-windows, the user of the real-time messaging client can flexibly select which message fragment to work with at a point in time. An IM user is able to conveniently save, edit, and send messages for which input was interrupted during a real-time messaging conversation.

As will be appreciated by one of skill in the art, embodiments of the present invention may be provided as (for example) methods, systems, and/or computer program products. The invention can take the form of an entirely hardware embodiment, an entirely software embodiment, or an embodiment containing both hardware and software elements. In a preferred embodiment, the invention is implemented in software, which includes (but is not limited to) firmware, resident software, microcode, etc. Furthermore, the present invention may take the form of a computer program product which is embodied on one or more computer-usable storage media (including, but not limited to, disk storage, CD-ROM, optical storage, and so forth) having computer-usable program code embodied therein, where this computer program product may be used by or in connection with a computer or any instruction execution system. For purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory ("RAM"), a read-only memory ("ROM"), a rigid magnetic disk, and an optical disk. Current examples of optical disks include compact disk read-only memory ("CD-ROM"), compact disk read/write ("CD-R/W"), and DVD.

Figure 4:
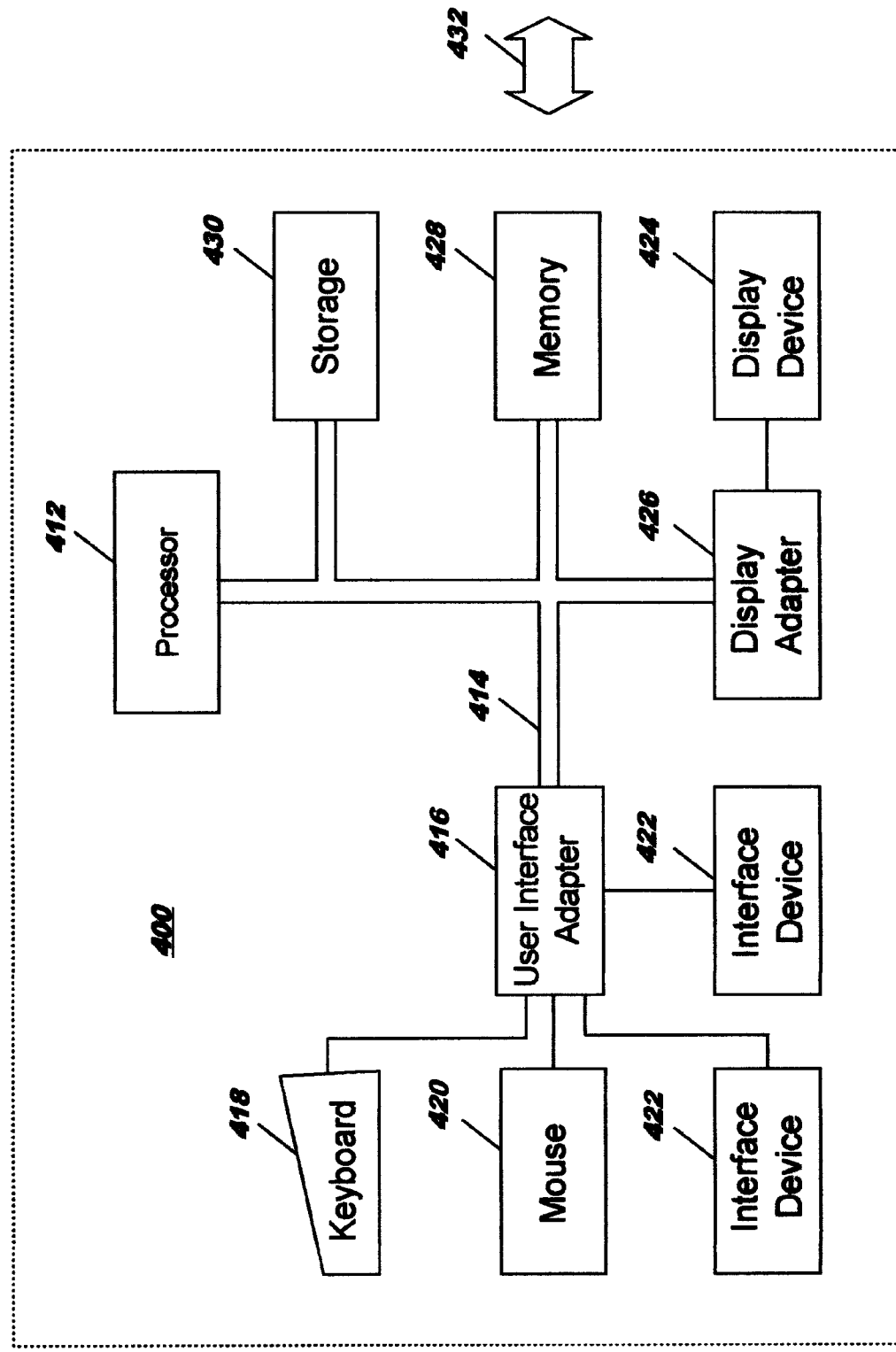
FIG. 4 depicts a data processing system suitable for storing and/or executing program code.

Referring now to FIG. 4, a data processing system 400 suitable for storing and/or executing program code includes at least one processor 412 coupled directly or indirectly to memory elements through a system bus 414. The memory elements can include local memory 428 employed during actual execution of the program code, bulk storage 430, and cache memories (not shown) which provide temporary storage of at least some program code in order to reduce the number of times code must be retrieved from bulk storage during execution.

Input/output (I/O") devices (including but not limited to keyboards 418, displays 424, pointing devices 420, other interface devices 422, etc.) can be coupled to the system either directly or through intervening I/O controllers or adapters (416, 426).

Network adapters may also be coupled to the system to enable the data processing system to become coupled to other data processing systems or remote printers or storage devices through intervening private or public networks (as shown generally at 432). Modems, cable modem attachments, wireless adapters, and Ethernet cards are just a few of the currently-available types of network adapters.

Figure 5:
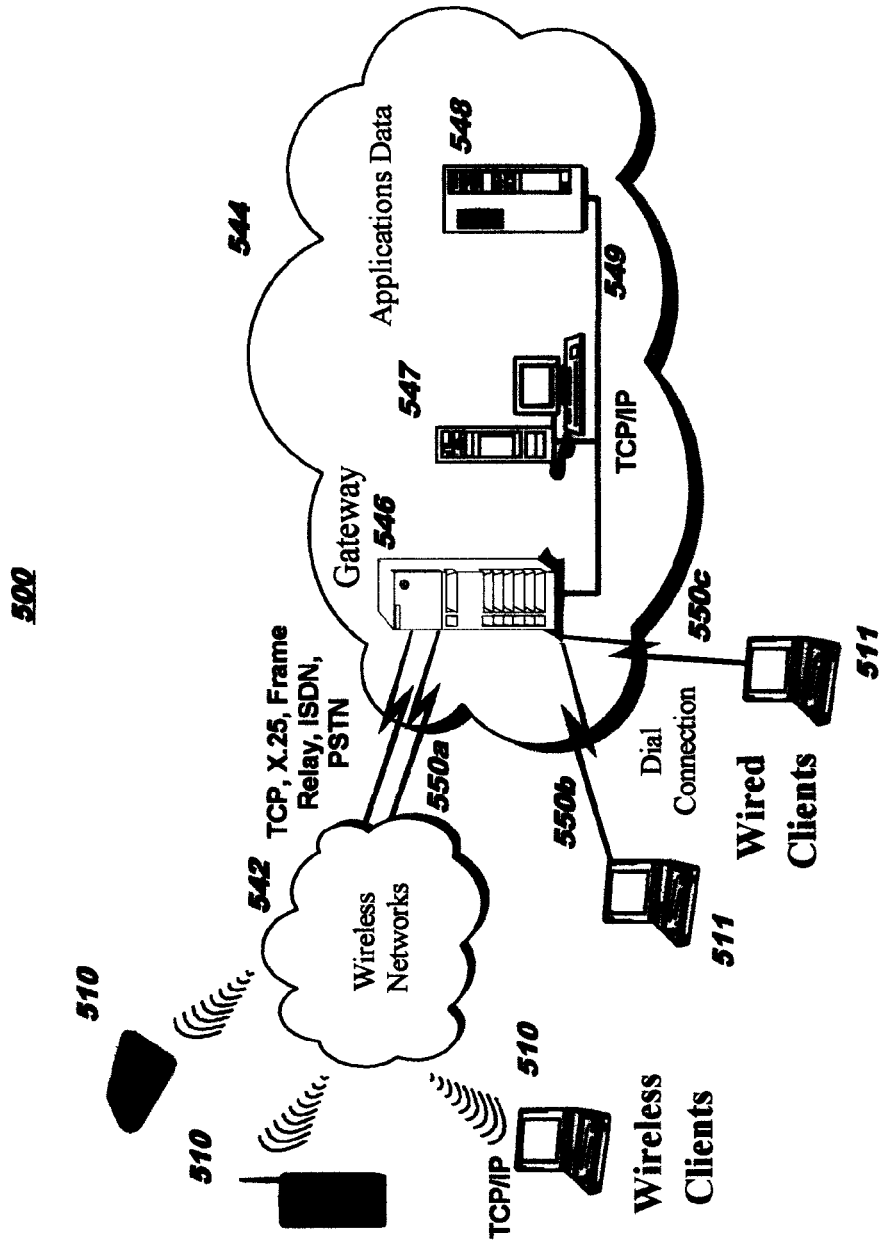
FIG. 5 depicts a representative networking environment in which one or more embodiments of the present invention may be used.

FIG. 5 illustrates a data processing network environment 500 in which the present invention may be practiced. The data processing network 500 may include a plurality of individual networks, such as wireless network 542 and network 544. A plurality of wireless devices 510 may communicate over wireless network 542, and a plurality of wired devices, shown in the figure (by way of illustration) as workstations 511, may communicate over network 544. Additionally, as those skilled in the art will appreciate, one or more local area networks ("LANs") may be included (not shown), where a LAN may comprise a plurality of devices coupled to a host processor.

Still referring to FIG. 5, the networks 542 and 544 may also include mainframe computers or servers, such as a gateway computer 546 or application server 547 (which may access a data repository 548). A gateway computer 546 serves as a point of entry into each network, such as network 544. The gateway 546 may be preferably coupled to another network 542 by means of a communications link 550a. The gateway 546 may also be directly coupled to one or more workstations 511 using a communications link 550b, 550c, and/or may be indirectly coupled to such devices. The gateway computer 546 may be implemented utilizing an Enterprise Systems Architecture/370™ available from IBM, an Enterprise Systems Architecture/390® computer, etc. Depending on the application, a midrange computer, such as an Application System/400® (also known as an AS/400®) may be employed. ("Enterprise Systems Architecture/370" is a trademark of IBM; "Enterprise Systems Architecture/390", "Application System/400", and "AS/400" are registered trademarks of IBM in the United States, other countries, or both.)

The gateway computer 546 may also be coupled 549 to a storage device (such as data repository 548).

Those skilled in the art will appreciate that the gateway computer 546 may be located a great geographic distance from the network 542, and similarly, the wireless devices 510 and/or workstations 511 may be located some distance from the networks 542 and 544, respectively. For example, the network 542 may be located in California, while the gateway 546 may be located in Texas, and one or more of the workstations 511 may be located in Florida. The wireless devices 510 may connect to the wireless network 542 using a networking protocol such as the Transmission Control Protocol/Internet Protocol ("TCP/IP") over a number of alternative connection media, such as cellular phone, radio frequency networks, satellite networks, etc. The wireless network 542 preferably connects to the gateway 546 using a network connection 550a such as TCP or User Datagram Protocol ("UDP") over IP, X.25, Frame Relay, Integrated Services Digital Network ("ISDN"), Public Switched Telephone Network ("PSTN"), etc. The workstations 511 may connect directly to the gateway 546 using dial connections 550b or 550c. Further, the wireless network 542 and network 544 may connect to one or more other networks (not shown), in an analogous manner to that depicted in FIG. 5.

The present invention has been described with reference to flow diagrams and/or block diagrams according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While preferred embodiments of the present invention have been described, additional variations and modifications in those embodiments may occur to those skilled in the art once they learn of the basic inventive concepts. Therefore, it is intended that the appended claims shall be construed to include preferred embodiments and all such variations and modifications as fall within the spirit and scope of the invention.

The invention claimed is:

1. A programmatic method of caching message fragments during real-time messaging conversations, comprising:

receiving, while a user is creating a first outbound chat message during a real-time messaging conversation, an inbound chat message;

caching the created first outbound chat message as a message fragment in a message cache, subsequent to the receiving and without sending the first outbound chat message;

sending a second outbound chat message created by the user during the real-time messaging conversation, the second outbound chat message responding to the received inbound chat message, wherein:

a representation of the message fragment is copied, responsive to the caching, to a sub-window rendered on a graphical user interface ("GUI") of the real-time messaging conversation, the sub-window separate from an active window used by the user for creating the first outbound chat message and the second outbound chat message;

subsequent to the sending of the second outbound chat message and responsive to a request of the user, recalling the cached message fragment from the message cache and restoring content of the first outbound chat message from the recalled message fragment; and sending the first outbound chat message during the real-time messaging conversation.

2. The method according to claim 1, wherein the user requests operation of the caching by selecting a clickable graphic rendered on the graphical user interface ("GUI") of the real-time messaging conversation.

3. The method according to claim 1, wherein the user requests operation of the caching by selecting a hot key indicated on the graphical user interface ("GUI") of the real-time messaging conversation.

4. The method according to claim 1, wherein the recalling further comprises:

enabling the user to select the rendered sub-window;
copying the cached message fragment displayed in the selected sub-window to the active window; and
closing the selected sub-window.

5. The method according to claim 1, further comprising enabling the user to edit the first outbound chat message, subsequent to the recalling and the restoring, prior to the sending of the first outbound chat message.

6. The method according to claim 1, further comprising:

receiving a second inbound chat message during the real-time messaging conversation, subsequent to receiving the inbound chat message, while the user is creating the second outbound chat message but prior to the sending of the second outbound chat message;

caching the created second outbound chat message as a second message fragment in the message cache, subsequent to the receiving of the second inbound chat message and without sending the second outbound chat message;

sending a third outbound chat message created by the user during the real-time messaging conversation, the third outbound chat message responding to the received second inbound chat message;

subsequent to the sending of the third outbound chat message and responsive to a request of the user for recalling the cached second message fragment, recalling the cached second message fragment from the message cache and restoring content of the second outbound chat message from the recalled second message fragment, the cached message fragment cached from the created first outbound chat message remaining in the message cache; and sending the second outbound chat message during the real-time messaging conversation.

7. The method according to claim 6, wherein multiple sub-windows are rendered on the GUI when multiple message fragments are cached, each rendered sub-window displaying a different one of the cached message fragments.

8. The method according to claim 7, wherein each of the sub-windows is rendered in a push-down stack order.

9. The method according to claim 7, further comprising:
enabling the user to select any one of the rendered sub-windows; and
copying the cached message fragment displayed in the selected sub-window to the active window; and
closing the selected sub-window.

10. The method according to claim 6, further comprising enabling the user to edit the second outbound chat message, subsequent to the recalling and the restoring, prior to the sending of the second outbound chat message.

11. The method according to claim 1, wherein:
a plurality of real-time messaging conversations are simultaneously active; and message fragments cached for each of the real-time messaging conversations are cached in a logically-separate message cache.

12. The method according to claim 1, wherein the real-time messaging conversation is an instant messaging conversation.

13. The method according to claim 1, wherein the real-time messaging conversation is a text messaging conversation.

14. A system for caching message fragments during real-time messaging conversations, comprising:

a computer comprising a processor; and
instructions which are executable, using the processor, to perform functions comprising:

receiving, while a user is creating a first outbound chat message during a real-time messaging conversation, an inbound chat message;

caching the created first outbound chat message as a message fragment in a message cache, subsequent to the receiving and without sending the first outbound chat message;

sending a second outbound chat message created by the user during the real-time messaging conversation, the second outbound chat message responding to the received inbound chat message, wherein:

a representation of the message fragment is copied, responsive to the caching, to a sub-window rendered on a graphical user interface ("GUI") of the real-time messaging conversation, the sub-window separate from an active window used by the user for creating the first outbound chat message and the second outbound chat message;

subsequent to the sending of the second outbound chat message and responsive to a request of the user, recalling the cached message fragment from the message cache and restoring content of the first outbound chat message from the recalled message fragment; and sending the first outbound chat message during the real-time messaging conversation.

15. The system according to claim 14, wherein the functions further comprise enabling the user to edit the first outbound chat message, subsequent to the recalling and the restoring, prior to the sending of the first outbound chat message.

16. The system according to claim 14, wherein the real-time messaging conversation is an instant messaging conversation.

17. A computer program product for caching message fragments during real-time messaging conversations, the computer program product comprising at least one non-transitory computer-usable media storing computer-usable program code, wherein the computer-usable program code, when executed on a computer, causes the computer to:

receive, while a user is creating a first outbound chat message during a real-time messaging conversation, an inbound chat message;

cache the created first outbound chat message as a message fragment in a message cache, subsequent to the receiving and without sending the first outbound chat message;

send a second outbound chat message created by the user during the real-time messaging conversation, the second outbound chat message responding to the received inbound chat message, wherein:

a representation of the message fragment is copied, responsive to the caching, to a sub-window rendered on a graphical user interface ("GUI") of the real-time messaging conversation, the sub-window separate from an active window used by the user for creating the first outbound chat message and the second outbound chat message;

subsequent to the sending of the second outbound chat message and responsive to a request of the user, recall the cached message fragment from the message cache and restore content of the first outbound chat message from the recalled message fragment; and send the first outbound chat message during the real-time messaging conversation.

18. The computer program product according to claim 17, wherein the computer-usable program code, when executed on the computer, further causes the computer to enable the user to edit the first outbound chat message, subsequent to the recalling and the restoring, prior to the sending of the first outbound chat message.

19. The computer program product according to claim 17, wherein the real-time messaging conversation is a text messaging conversation.

* * * * *